(12) United States Patent
Heuschober et al.

(10) Patent No.: US 7,337,523 B1
(45) Date of Patent: Mar. 4, 2008

(54) METHODS AND APPARATUS FOR AN ANNULAR CORE CUTTER

(75) Inventors: Michael S. Heuschober, Florissant, MO (US); Jeffrey E. Polus, Hillsboro, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/464,082

(22) Filed: Aug. 11, 2006

(51) Int. Cl.
*B23P 23/00* (2006.01)
*B23Q 11/00* (2006.01)

(52) U.S. Cl. .................. 29/566; 409/132; 409/137; 409/138; 407/2; 408/22; 408/67

(58) Field of Classification Search ........... 409/132 M, 409/137, 138–140, 232, 234, 132, 131; 29/566, 29/56.5; 407/53, 2–6; 408/203.5, 205–207, 408/22, 24, 26, 67
See application file for complete search history.

(56) References Cited

U.S. PATENT DOCUMENTS

| | | | | |
|---|---|---|---|---|
| 2,680,898 A * | 6/1954 | Diosi, Sr. ..................... | 407/59 |
| 2,894,583 A * | 7/1959 | Johnstad ...................... | 83/663 |
| 3,264,128 A * | 8/1966 | Argueso, Jr. et al. ... | 106/287.17 |
| 3,765,789 A * | 10/1973 | Hougen ....................... | 408/204 |
| 4,586,857 A * | 5/1986 | Ohmi .......................... | 408/206 |
| 4,677,886 A * | 7/1987 | Neu .............................. | 82/53 |
| 4,794,836 A * | 1/1989 | Villani ......................... | 83/853 |
| 4,907,920 A * | 3/1990 | Lund et al. .................. | 409/132 |
| 5,015,128 A * | 5/1991 | Ross et al. ................... | 408/59 |
| 5,221,163 A * | 6/1993 | Nishimura ................... | 408/230 |
| 5,253,961 A * | 10/1993 | Geissler ....................... | 408/58 |
| 6,588,992 B2 * | 7/2003 | Rudolph ...................... | 408/204 |

FOREIGN PATENT DOCUMENTS

DE        3831046 A1 *   3/1990

* cited by examiner

*Primary Examiner*—Erica Cadugan
(74) *Attorney, Agent, or Firm*—Ingrassia Fisher & Lorenz, P.C.

(57) ABSTRACT

An annular core cutting apparatus includes a cutting head including a generally cylindrical sidewall having a first end and a second end, wherein the first end has a cutting edge, and wherein the sidewall includes a plurality of openings having at least one sharpened edge. A spindle is coaxially and rigidly coupled to the second end of the cylindrical sidewall, and the spindle configured to rotate about a rotational axis. In a further embodiment, a generally conical member is disposed within the cutting apparatus to assist with grinding and removal of waste material.

17 Claims, 3 Drawing Sheets

METHODS AND APPARATUS FOR AN ANNULAR CORE CUTTER

TECHNICAL FIELD

The present invention generally relates to machining technology and, more particularly, to automated core machining of materials such as foam and honeycomb-core materials.

BACKGROUND

When performing automated machining of certain materials, such as foam and honeycomb-core materials (generally referred to as "core" materials), certain geometries may be encountered that are difficult or impossible to produce using standard circular disk cutters. That is, the head of such cutters are prone to impacting the core and inadvertently damaging or destroying the workpiece.

Conventional core machining is done with the cutter positioned at 90 degrees to the workpiece, and this angular relationship is maintained throughout the machining operation. Referring to FIG. 1, for example, a workpiece 102 is machined using a cutting head 104 including a cutting disk 106 attached to a rotating spindle 105, wherein spindle 105 has a rotational axis 110, and wherein the cutting direction 112 of cutting head 104 is substantially perpendicular (within a small lead angle Θ) to rotational axis 110. Stated another way, rotational axis 110 of spindle 105 is maintained, during a cutting operation, substantially normal to the plane of the work surface 103. In this illustration, "combing" or "trailing" cutting paths are exclusively used for carving of the core. Complex geometry cannot be reached in this fashion. Furthermore, the sidewalls of workpiece 102 (e.g., surface 113) cannot be cut without rotating spindle 105 by approximately 90 degrees.

Accordingly, it is desirable to provide improved core machining tools and methods. Furthermore, other desirable features and characteristics of the present invention will become apparent from the subsequent detailed description and the appended claims, taken in conjunction with the accompanying drawings and the foregoing technical field and background.

BRIEF SUMMARY

The present invention generally relates to an annular core cutting apparatus capable of machining core workpieces along an orientation parallel to the cutting surface. In accordance with one embodiment, for example, a core cutting apparatus includes a cutting head including a generally cylindrical sidewall having a first end and a second end, wherein the first end has a cutting edge, and wherein the sidewall includes a plurality of openings having at least one sharpened edge. A spindle is coaxially and rigidly coupled to the second end of the cylindrical sidewall, and the spindle configured to rotate about a rotational axis. In a further embodiment, a generally conical member is disposed within the cutting apparatus to assist with grinding and removal of waste material.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. For the sake of brevity, conventional techniques related to computer-aided manufacturing (CAM), machining, and other conventional tools and techniques may not be described in detail herein.

In general, the present invention relates to an improved core cutting apparatus that allows cutting of parts traditionally difficult or impossible to cut due to cutter limitations and/or physical machine head size. The annular cutter of the present invention is capable of machining core in an orientation that is parallel to the cutting surface, rather than perpendicular to the cutting surface as with prior art systems.

Figure 1:
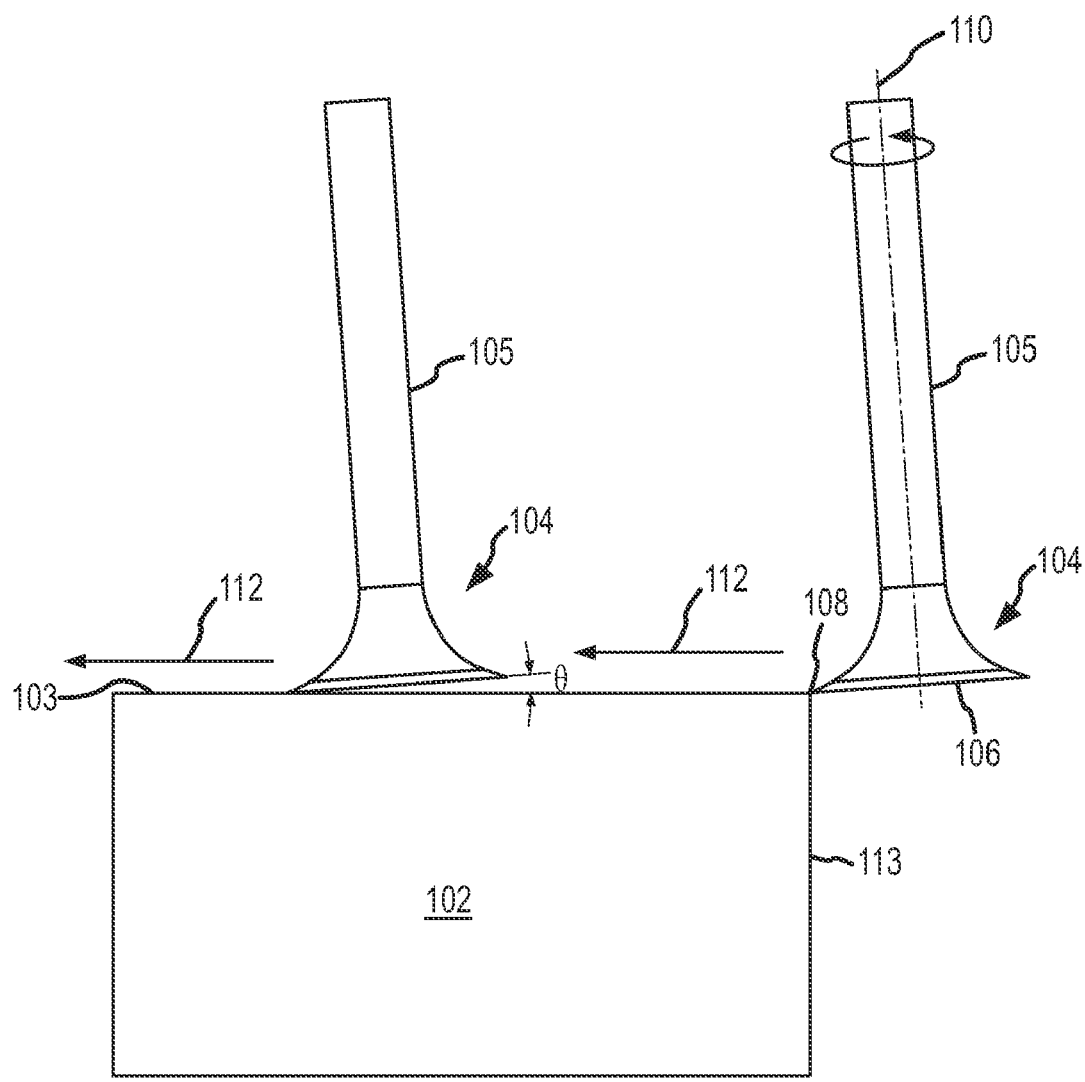
FIG. 1 is an overview of a typical prior art circular disk cutting operation.

Referring to FIG. 1, a core cutting apparatus generally includes a cutting head 206 which is rigidly and coaxially secured (using any convenient method) to a spindle 202. Spindle 202, during normal operation, spins at an appropriate rate, and may be attached to a variety of manipulators, controllers, computers, and the like. In one embodiment, for example, spindle 202 is coupled to a five-axis manipulator of the type well known in the art.

Cutting head 206 includes a generally cylindrical sidewall 208 having any convenient length and diameter, depending upon the cutting application. Cutting head 206 is thus generally ring-shaped, or "annular." One end of sidewall 208 has a cutting edge 220, which is serrated, saw-tooth-shaped, or has any suitable texture or geometry capable of cutting a core-type material. In this regard, the term "core" or "core-type" material refers to a material that has an internal, often regular geometric structure, rather than a homogeneous, contiguous structure. Such structures include, for example, honeycomb-shaped structures and the like. Materials such as Kevlar, steel, aluminum, or any other plastic, metal, or ceramic may be used.

Cutting head 206 is suitably attached to spindle 202 either removeably or permanently, through any suitable hardware arrangement (e.g., using a chuck and shank configuration, etc.). Spindle 202 and cutting head 206 thus together rotate (either in one direction or both directions) with respect to a rotational axis 204. The speed of rotation will vary depending upon the application, but in various embodiments ranges upwards of 10,000 to 15,000 RPM.

Sidewall 208 further includes one or more openings 210 (or "flutes") that extend through the thickness of the sidewall. These openings function, in part, to allow cut-away material (or "offal") to be removed from cutting head 206 during operation. There may be any number of such openings, depending upon the application, and the openings may have any convenient shape. In the illustrated embodiment, for example, a total of four generally spiral-shaped openings are distributed uniformly around the surface of sidewall 208. In this embodiment, slightly less than half of the cylindrical surface area of sidewall 208 is taken up by openings 210; however, the present invention is not so limited, and comprehends any number of openings having any suitable shape, size, and distribution.

Figure 2:
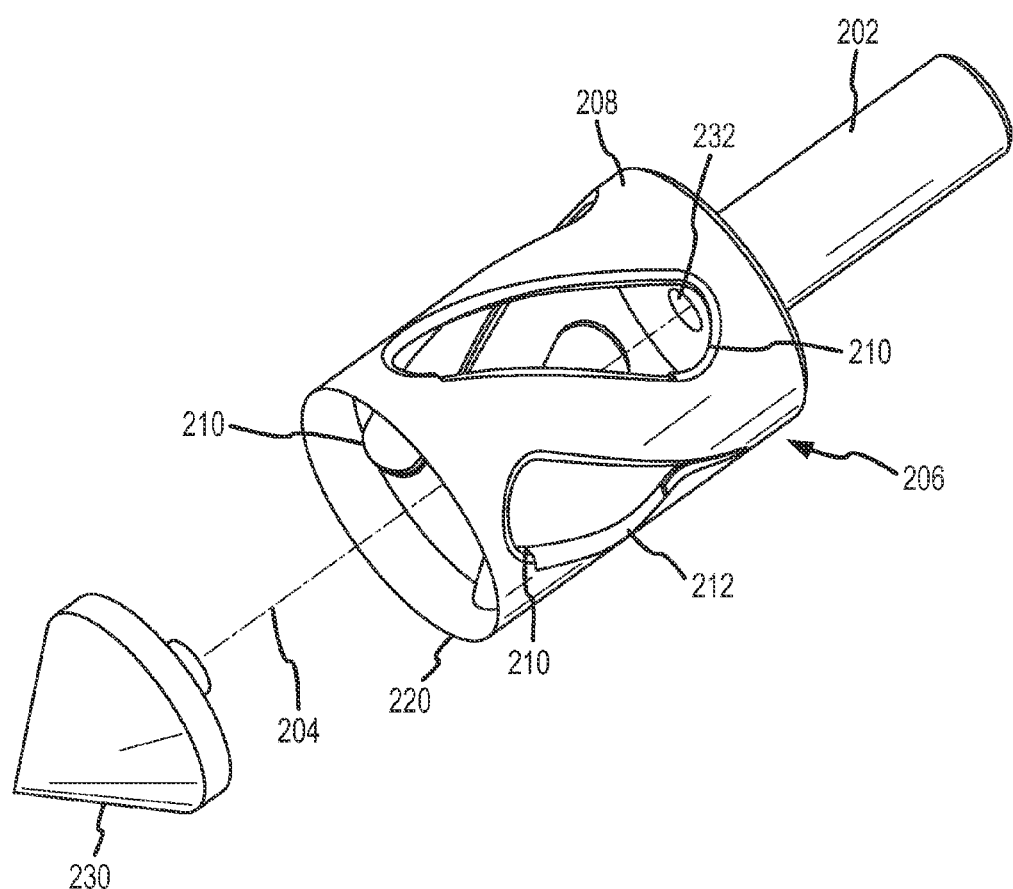
FIG. 2 is a core carving apparatus in accordance with one embodiment of the present invention.

In one embodiment, all or a portion of openings 210 have sharpened or chamfered edges. For example, in FIG. 2, region 212 within each opening 210 is sharpened. Such an embodiment is useful when the tool is designed to rotate in a single direction (in this case, clockwise as viewed down spindle 202 to cutting head 206). These edges may include any suitable structure, including saw-teeth, serrations, etc.

In a further embodiment, a generally conical member 230 is coupled to spindle 202 and/or cutting head 206 adjacent to the end opposite cutting edge 220 (e.g., region 232). Conical member 230 preferably acts to break up cut-away material prior to it being ejected through openings 210. In this regard, conical member 230 may comprise, for example, a silicon-carbide grinding surface, such as a surface with screw-like serrations. Conical member 230 need not be actually conical in shape: it may have any curvilinear or rectilinear shape capable of assisting with radial movement of offal through the interior of cutting head 206 during operation.

The various subcomponents of cutting head 206 may be manufactured using any suitable material or combination of materials. In one embodiment, for example, sidewall 208 and conical member 230 are fabricated from a high-speed steel and/or silicon-carbide material.

Figure 3:
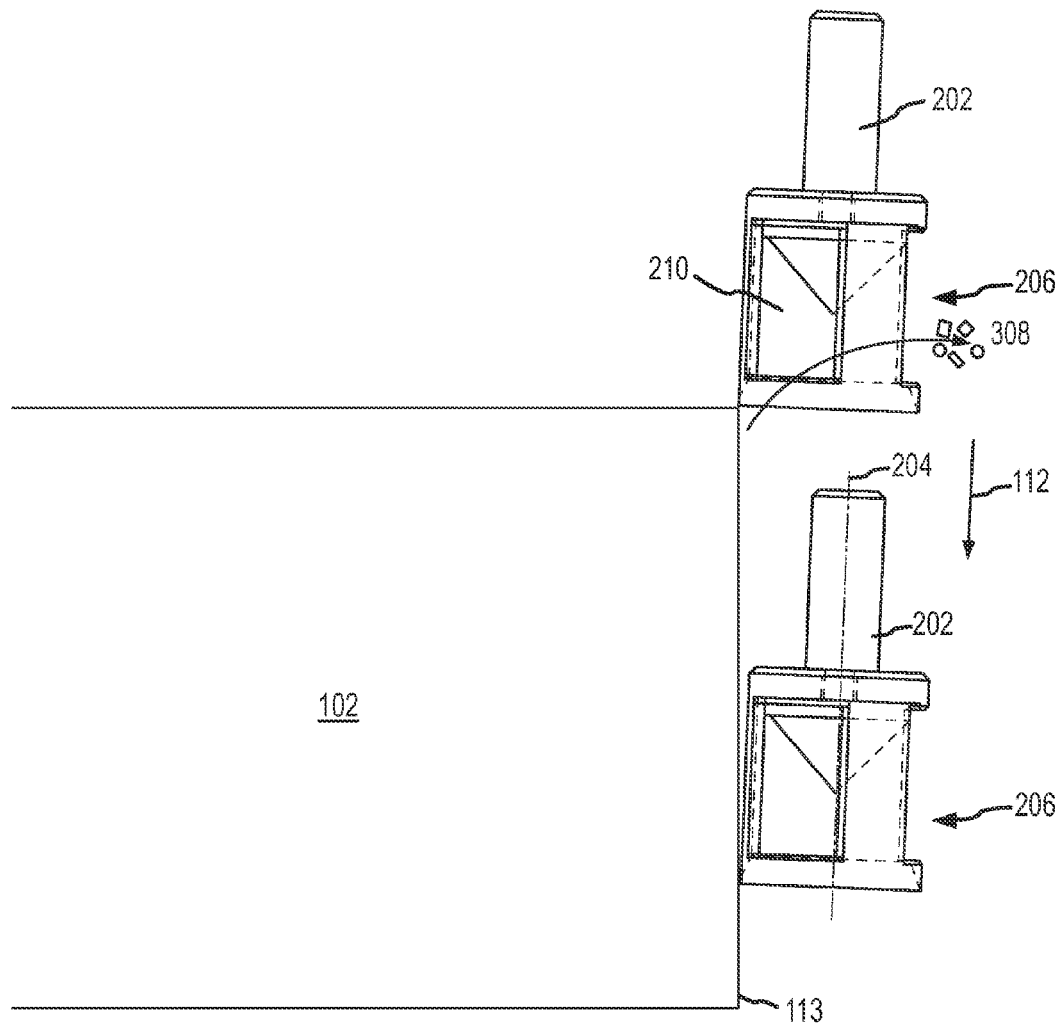
FIG. 3 is an overview of a core carving operation in accordance with the present invention.

Having thus given a description of a cutting apparatus of the present invention, it can be seen that this arrangement provides certain advantages when machining core materials. Referring to FIG. 3, for example, a workpiece 102 has a surface 113 which, as described early with respect to FIG. 1, cannot easily be cut using traditional disk cutters.

As shown, however, a cutting head 206 in according with the present invention moves downward along a cutting direction 112 that is actually substantially parallel to (minus a small lead angle) the rotational axis 204. It will be noted that the size and shape of openings 210 in the embodiment shown in FIG. 3 is somewhat different from that shown in FIG. 2. That is, simple rectangular openings 210 with sharpened edges on both sides of the opening are used. As illustrated, the system is able to make plunge cuts (i.e., cuts consisting of simple downward motion), but is also capable of fabricating fine edge geometries using a proper manipulator path.

It should also be appreciated that the illustrated embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A cutting apparatus comprising:
    a cutting head including a generally cylindrical sidewall having a first end and a second end, wherein the first end has a cutting edge, and wherein the sidewall includes a plurality of openings, at least one edge of the plurality of openings being sharpened;
    a spindle coaxially and rigidly coupled to the second end of the cylindrical sidewall, the spindle configured to rotate about a rotational axis; and
    a generally conical grinding member converging toward the first end and being coupled to the spindle adjacent the second end of the cylindrical sidewall.

2. The cutting apparatus of claim 1, wherein the generally cylindrical sidewall is substantially hollow.

3. The cutting apparatus of claim 1, wherein the generally conical member is disposed within the generally cylindrical sidewall.

4. The cutting apparatus of claim 1, wherein a grinding surface of the grinding member comprises silicon carbide.

5. The cutting apparatus of claim 1, wherein the cutting edge is configured to cut a core material.

6. The cutting apparatus of claim 5, wherein the cutting edge is annular.

7. The cutting apparatus of claim 1, wherein the openings are configured to allow offal to escape therethrough.

8. The cutting apparatus of claim 1, wherein the spindle is configured to be mechanically coupled to a five-axis manipulator.

9. The cutting apparatus of claim 1, wherein the cutting head is configured to have a preferred cutting direction substantially parallel to the rotational axis.

10. A method for cutting a workpiece comprising a core material, the method comprising:
    providing a cutting apparatus comprising a cutting head with a generally cylindrical sidewall having a first end and a second end, wherein the first end has a cutting edge, and wherein the sidewall includes a plurality of openings, at least one edge of the plurality of openings being sharpened, a spindle coaxially and rigidly coupled to the second end of the cylindrical sidewall, the spindle configured to rotate about a rotational axis and a generally conical grinding member converging toward the first end and being coupled to the spindle adjacent the second end of the cylindrical sidewall;
    positioning the cutting head on a cutting surface of the workpiece such that the rotational axis is substantially parallel to the workpiece;
    cutting away a portion of the workpiece by moving the cutting head in a direction that is substantially parallel to a cutting surface of the workpiece; and
    ejecting the cut-away portion of the workpiece through the plurality of openings.

11. The method of claim 10, wherein the method further includes grinding the cut-away portion of the workpiece using the conical member prior the ejecting step.

12. The method of claim 10, wherein the cutting edge is annular.

13. The method of claim 10, wherein the spindle is configured to be moved using a five-axis manipulator.

14. A core cutting head of the type configured to be mechanically coupled to a rotating spindle having a rotational axis, the cutting head comprising:
    an annular blade having a cutting edge at a first end thereof;
    at least one opening in the annular blade, at least one edge of the opening having a cutting region; and
    a generally conic grinding element provided within the annular blade adjacent a second opposite end of the annular blade adjacent to the spindle and converging toward the first end.

15. The core cutting head of claim 14, wherein the generally conic grinding element comprises a silicon carbide grinding surface.

16. The core cutting head of claim 14, wherein the at least one opening is generally rectangular.

17. The core cutting head of claim 14, wherein the at least one opening is generally spiral with respect to the rotational axis.

* * * * *